UNITED STATES PATENT OFFICE.

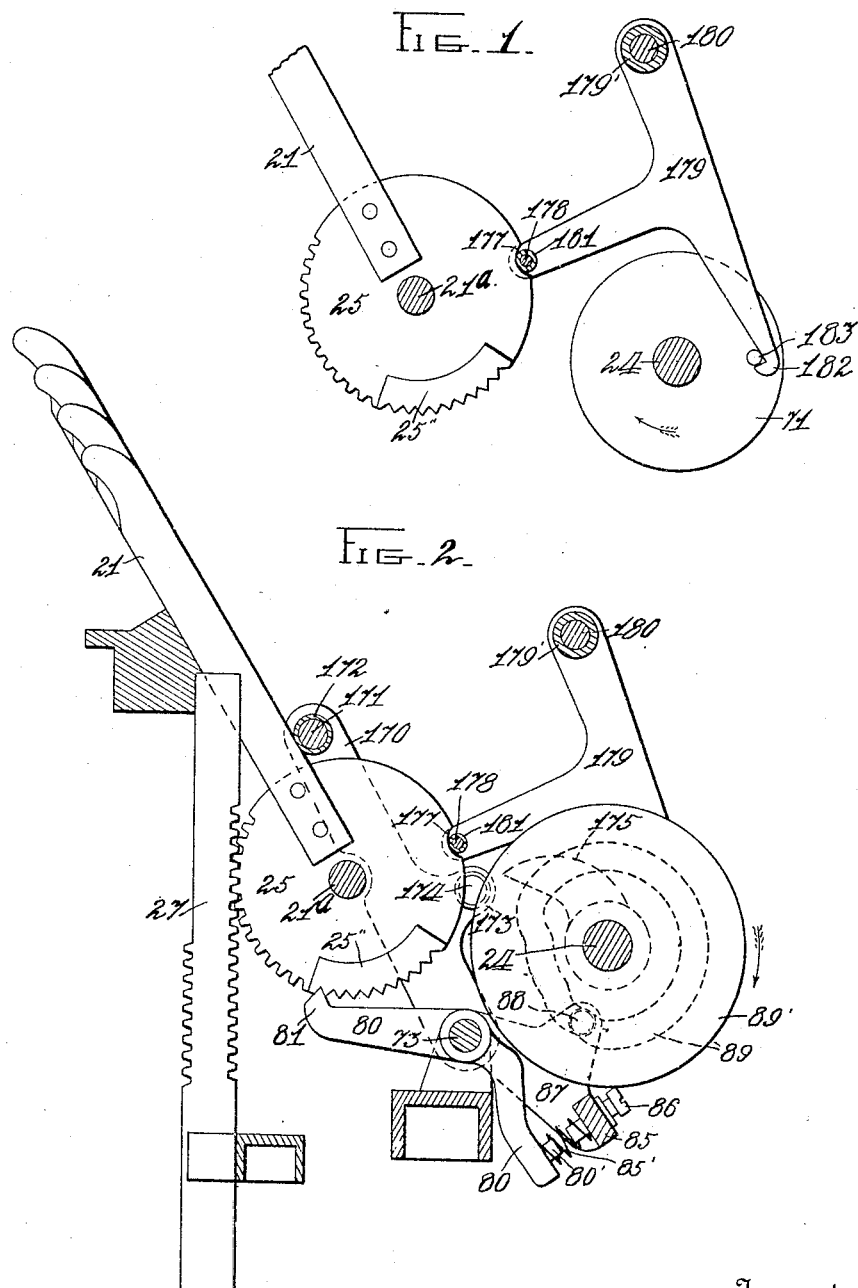

THOMAS CARROLL, OF DAYTON, OHIO, ASSIGNOR, BY MESNE ASSIGNMENTS, TO THE NATIONAL CASH REGISTER COMPANY, OF DAYTON, OHIO, A CORPORATION OF OHIO, (INCORPORATED IN 1906.)

CASH-REGISTER.

No. 903,838.

Specification of Letters Patent.

Patented Nov. 17, 1908.

Original application filed June 6, 1903, Serial No. 160,416. Divided and this application filed April 10, 1905. Serial No. 254,648.

*To all whom it may concern:*

Be it known that I, THOMAS CARROLL, a citizen of the United States, residing at Dayton, in the county of Montgomery and State of Ohio, have invented certain new and useful Improvements in Cash-Registers, of which I declare the following to be a full, clear, and exact description.

This invention relates to improvements in cash registers and is shown more particularly as relating to the type of machine in which there are a series of manipulative setting levers and an operating mechanism and has among its objects to provide improved locking and alining devices in connection therewith; this application being a division of a co-pending application Serial No. 160,416, filed by me on June 6, 1903.

With these and incidental objects in view, the invention consists in certain novel features of construction and combinations of parts, the essential elements of which are set forth in appended claims and a preferred form of embodiment of which is hereinafter specifically described with reference to the drawings which accompany and form part of this specification.

Of said drawings: Figure 1 represents a detail view of the locking device for the operating mechanism; and Fig. 2 represents a detail sectionalized view showing the alining devices and also the locking device referred to in Fig. 1.

In this particular machine there are a series of manipulative levers which are adjusted to different positions according to the amount to be registered or recorded and then the completion of the operation is effected by the rotation of a main operating shaft by means of a crank handle or other suitable means. The aforesaid setting levers 21 are each fast to disks 25 which are journaled upon a transverse shaft 21ª, and these disks 25 are formed with gear teeth meshing with corresponding teeth of vertical rack bars 27 which are adjusted to various heights according to the movements of the setting levers and thereby the differential movements of these vertical rack bars may be utilized to effect the registration or recording of the various amounts, all of which will not be further described as it constitutes no part of the present invention. Subsequent to the setting of said levers, the completion of the operation of the machine is effected by a rotation of the main operating shaft 24 which is rotated through the medium of any suitable crank handle or other power application means, the direction of rotation of this shaft being shown by the arrow in Figs. 1 and 2 and the shaft in this particular instance being adapted to have one complete revolution at each operation of the machine.

In order to aline the setting levers so that they will always stop at a point directly opposite some numeral upon the index plates, and for the further purpose of locking the setting levers and the parts controlled thereby, during the revolution of the crank handle, I provide a series of locking and alining pawls 80, best shown in Fig. 2, and pivotally mounted upon the transverse shaft 73. These pawls are of bell crank formation and the forward end of each is formed into a wedge-shaped upturned nose 81 which coöperates with the teeth of its respective locking plate 25″ fast on the side of the disk 25. The downwardly turned rear ends of these pawls extend in front of the cross bar of a locking frame 85 which is pivotally mounted upon the shaft 73. The frame 85 is provided with a series of set screws 86 which coöperate with noses 80′ on the pawls 80 for adjusting the relative positions of the two parts. Coil springs 85′ are mounted upon the set screws 86 and the noses 80′ of the pawls to normally hold the two separated. The locking frame 85 is formed with an arm 87 which is provided with an anti-friction roller 88. This roller operates in the cam groove 89 of a box cam 89′ which is secured upon the rotary shaft 24. The formation of the cam groove 89 is such that when the parts are in their normal positions, shown in Fig. 2, the pawls 80 may be rocked downward by the operation of the respective disks 25 together wth the levers 21. After the levers have been set however, and the rotation shaft moved from its normal position, the frame 85 is cammed downward and forward until the set screws or bolts 86 engage the noses 80′, when the pawls 80 become locked against movement thereby also locking the adjusting levers 21.

After the registration has been made and the printing accomplished the pawls 80 are released and allowed to drop by the frame 85 rocking back to a position in which all tension upon the springs 86' is removed. During the time the frame 85 remains in this position, the levers 21 are virtually free, and are returned to their normal positions by devices hereinafter described. After the levers 21 have been so returned the frame 85 is again rocked forward into the position shown in Fig. 2, whereby the springs 85' are put under tension to cause the pawls 80 to properly aline and restrain the levers 21 when they are subsequently operated. When any one of the levers 21 is actuated and while it is in a position intermediate any two characters on the index plates the nose 80' will be contacting with the end of its respective screw bolt 86, and if an attempt be made to operate the machine at this time, the initial downward movement of the frame 85 will force the alining pawls to become seated between the teeth on the plates 25'', and will thus move the levers 21 to positions in alinement with either one numeral or the other and lock them so. If any one of the levers 21 is held in an intermediate position by the operator, then the operating handle will be locked as no rotation of the shaft 24 can take place unless the frame 85 is free to move downward.

As before stated, the setting levers 21 that have been operated are returned to normal position during the latter part of each operation of the machine. This result is effected by means of pivoted levers 170 journaled upon the shaft 73 and connected by a tie bar 171 which is provided with a series of antifriction rollers 172, which when the frame is rocked, engage the respective levers 21 and force them forward. Each of the levers 170 is formed with a nose 173, carrying an antifriction roller 174 which coöperates with a cam 175. These cams are mounted upon the rotation shaft 24 and are so formed as to force the levers 170 forward after the registration and printing have taken place. When a lever is operated the bar 171 is only forced backward a distance equal to the movement of said lever.

Each of the disks 25 is formed with a notch 177 through which projects a tie bar 178 connecting two pivoted levers 179, which are fast to a sleeve 179' journaled upon a transverse shaft 180, as shown in Figs. 1 and 2. The tie bar 177 is provided with a series of antifriction rollers 181 which relieve the friction incidental to the contact of the walls of the notches 177 in forcing the tie bar rearward. One of the levers 179 is formed at its lower end with a hook 182 which normally stands in the path of a pin 183 mounted upon the box cam 71. By this means the operating crank handle is locked when all the levers 21 are in their normal positions. Should one of these levers however be moved from its normal position, the levers 179 will be cammed rearward and will thus move the hook 182 out of the path of the pin 183, to unlock the machine.

While the form of mechanism here shown and described is admirably adapted to fulfil the objects primarily stated, it is to be understood that it is not intended to confine the invention to the one form of embodiment herein disclosed, for it is susceptible of embodiment in various forms all coming within the scope of the claims which follow.

Having thus described my invention, what I claim as new and desire to secure by Letters Patent is:

1. In a cash register, the combination with an operating mechanism, of a series of setting elements arranged to be moved to different positions for different transactions, a lock for the operating mechanism, means for operating said lock when any one of the setting elements is moved from its normal position and means for positively returning said setting elements to normal position at each operation of the machine.

2. In a cash register, the combination with an operating mechanism, of a series of setting elements arranged to be moved to different positions for different transactions, an automatic lock for the operating mechanism for locking the latter whenever the setting elements are all moved to their normal positions, means for operating the lock when any one of the setting elements is moved out of its normal position and means for positively returning said setting elements to normal position at each operation of the machine.

3. In a cash register, the combination with an operating mechanism, of a series of setting elements arranged to be grasped and moved to different positions for different transactions, a lock for the operating mechanism, means for operating the lock when any one of the setting elements is moved out of its normal position and means for positively returning said setting elements to normal position at each operation of the machine.

4. In a cash register, the combination with an operating mechanism, of a series of setting levers arranged to be moved to different positions for different transactions, a lock for the operating mechanism, means for operating said lock when any one of the levers is displaced from its normal position, and means for positively returning said setting elements to normal position at each operation of the machine.

5. In a cash register, the combination with an operating mechanism, of a series of setting elements, locking and alining devices for said elements, a movable frame connected to the operating mechanism and arranged to lock said alining and locking devices, and means intermediate said frame and the locking devices for permitting an independent yielding movement of the latter when the frame is not in its locking position.

6. In a cash register, the combination with an operating mechanism, of a series of setting elements, spring alining devices for said elements, means for simultaneously returning the elements to their normal positions, and means connected to the operating mechanism for relieving the setting elements of the tension of the spring alining devices while said elements are being returned to their normal positions.

7. In a cash register, the combination with an operating mechanism, of a series of setting elements, locking and alining devices for said elements, springs for forcing the alining devices into engagement with the setting elements, means for simultaneously returning the setting elements to their normal positions, and mechanism for relieving the alining devices of the stress of the springs during such returning movements.

8. In a cash register, the combination with an operating mechanism, of a series of setting elements, locking and alining pawls engaging said elements, a movable frame, springs intermediate the frame and locking and alining devices, means connecting the frame to the operating mechanism whereby the tension of the springs may be altered, and devices for returning the setting elements to their normal positions.

9. In a cash register, the combination with an operating mechanism, of a series of setting elements, spring alining devices for said elements, means for simultaneously returning the setting elements to their normal positions, and devices connected to the operating mechanism for changing the tension of the springs of the alining devices during different movements of the machine.

10. In a cash register, the combination with an operating mechanism, of a series of setting elements, a locking device for the operating mechanism, camming devices intermediate the setting elements and locking device for operating the latter when any one of the setting elements is moved from its normal position and means for positively returning said setting elements to normal position at each operation of the machine.

11. In a cash register, the combination with an operating mechanism, of a series of setting elements including notched disks, a lock for the operating mechanism including a bar normally projecting through all of the notches and constructed to be forced out of the notches upon the operation of any one of the setting elements.

In testimony whereof I affix my signature in the presence of two witnesses.

THOMAS CARROLL.

Witnesses:
HERBERT C. WOOD,
FRANK PARKER DAVIS.